(12) United States Patent
Parzysz et al.

(10) Patent No.: US 11,954,999 B2
(45) Date of Patent: Apr. 9, 2024

(54) METHOD FOR ASSIGNING A SYSTEM FOR CONTROLLING A REMOTELY-CONTROLLED VEHICLE

(71) Applicant: Orange, Issy-les-Moulineaux (FR)

(72) Inventors: Fanny Parzysz, Chatillon (FR); Gaël Fromentoux, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 69 days.

(21) Appl. No.: 17/610,895

(22) PCT Filed: May 11, 2020

(86) PCT No.: PCT/EP2020/063039
§ 371 (c)(1),
(2) Date: Nov. 12, 2021

(87) PCT Pub. No.: WO2020/229404
PCT Pub. Date: Nov. 19, 2020

(65) Prior Publication Data
US 2022/0246025 A1 Aug. 4, 2022

(30) Foreign Application Priority Data
May 15, 2019 (FR) ..................... 1905084

(51) Int. Cl.
*G08C 17/02* (2006.01)
*H04W 12/06* (2021.01)
*H04W 12/69* (2021.01)

(52) U.S. Cl.
CPC ............ *G08C 17/02* (2013.01); *H04W 12/06* (2013.01); *H04W 12/69* (2021.01); *G08C 2201/21* (2013.01)

(58) Field of Classification Search
CPC ... G08C 17/02; G08C 2201/20; H04W 12/06; H04B 7/18506; H04L 63/08; H04L 63/06
See application file for complete search history.

(56) References Cited

U.S. PATENT DOCUMENTS

2018/0019802 A1* 1/2018 Teague ................ H04L 41/5022

FOREIGN PATENT DOCUMENTS

WO 2016154946 A1 10/2016

OTHER PUBLICATIONS

International Search Report dated Jul. 13, 2020 for corresponding International Application No. PCT/EP2020/063039, dated May 11, 2020.
Written Opinion of the International Searching Authority dated Jul. 13, 2020 for corresponding International Application No. PCT/EP2020/063039, filed May 11, 2020.
(Continued)

*Primary Examiner* — Vernal U Brown
(74) *Attorney, Agent, or Firm* — David D. Brush; Westman, Champlin & Koehler, P.A.

(57) ABSTRACT

A method for assigning a control system for controlling a remotely controlled vehicle, called a drone, the system being able to transmit data relating to at least one communication service and including a drone and a control entity for controlling the drone. The assignment method makes it possible to associate a set of services that a system supports with the system, and thus to correlate quality of service or security requirements with types of mission and profiles of drones.

15 Claims, 3 Drawing Sheets

(56) References Cited

OTHER PUBLICATIONS

Figure 1:
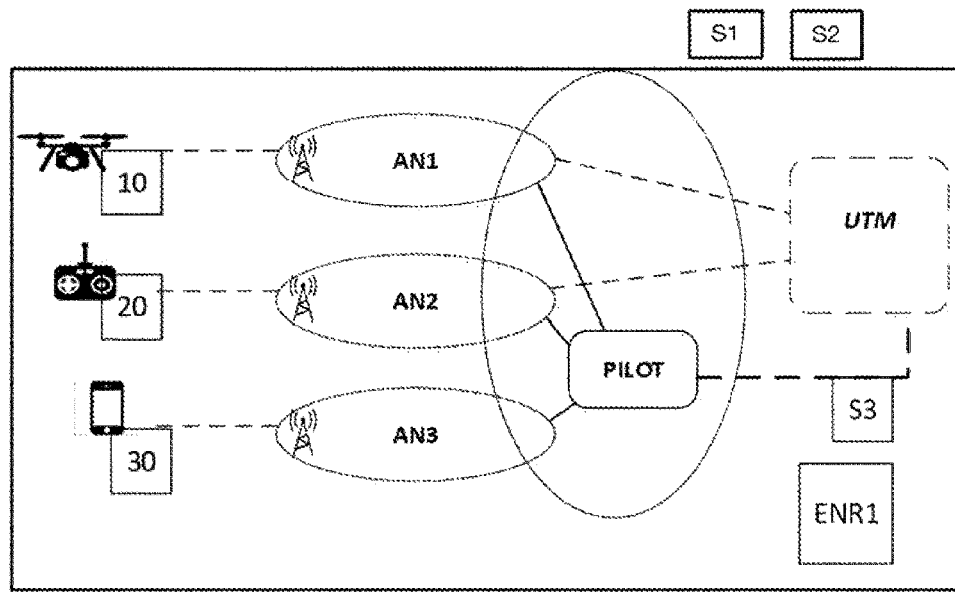

"Drones and networks: Ensuring safe and secure operations," Ericsson white paper, Nov. 2018.
English translation of the Written Opinion of the International Searching Authority dated Jul. 21, 2020 for corresponding International Application No. PCT/EP2020/063039, filed May 11, 2020.
"Remote identification of unmanned aerial systems," Technical Report, (Stage1—R16), 3GPP TR 22.825, V16.0.0, Sep. 2018.
"Using mobile networks to coordination unmanned aircraft traffic," GSM association, GSMA report, Nov. 23, 2018.

* cited by examiner

METHOD FOR ASSIGNING A SYSTEM FOR CONTROLLING A REMOTELY-CONTROLLED VEHICLE

CROSS-REFERENCE TO RELATED APPLICATIONS

This Application is a Section 371 National Stage Application of International Application No. PCT/EP2020/063039, filed May 11, 2020, which is incorporated by reference in its entirety and published as WO 2020/229404 A1 on Nov. 19, 2020, not in English.

1. TECHNICAL FIELD

The invention lies in the field of networks and services implemented from remotely controlled vehicles, also called drones. The invention aims more particularly to instantiate a means for authenticating and identifying a system based on a drone in order to establish connectivity of the drone, and accordingly to deploy services from the drone.

2. PRIOR ART

Remotely controlled vehicles, that is to say remotely piloted vehicles, more commonly called drones, are being used increasingly for uses as diverse as analyzing transport infrastructures (railways, electricity grids, road infrastructures), mapping or delivering goods to clients. These drones, which are more often than not aerial, may also be wheeled vehicles or even used at sea. They are characterized by the fact that the pilot is not located on board the vehicle but remotely from the vehicle, said vehicle being managed using a control device. Indeed, the drone may be moved remotely by the pilot using the device, or else the drone may move autonomously, for example with a programmed movement, but under the control of the pilot moving the drone.

The use of drones is strictly regulated, in particular due to safety issues, and the pilot remotely guiding the drone nowadays has to have the drone in his field of view. In addition, drones used at present communicate very little when they are active, for example in flight. A small amount of drone control data may typically be exchanged. Data relating to the mission of the drone (for example transport infrastructure analysis) are for their part more often than not recorded when the drone is activated, for example on a memory card, and this memory card is retrieved in order to be read when the drone returns to its base.

The upcoming evolution of services offered from these drones will undoubtedly be based on drones that move in a space that will be out of the line of sight of the pilot (BVLoS—Beyond Visual Line of Sight), thus affording the possibility of offering a wider range of services (surveillance, transmission of media streams, retransmission and broadcasting of information following a disaster) from a drone. These services may also require improving the real-time communication capabilities of the drone, but will also require a review of the identification and authentication model, and they may be accompanied by an evolution of the role model of drone-based services.

These evolutions may also be accompanied by a contribution from entities or parties involved in the management of services implemented from drones.

The industry (Drones and networks: Ensuring safe and secure operations, Ericsson's white paper, November 2018) and standardization bodies, such as the GSMA (GSM association—Using mobile networks to coordination unmanned aircraft traffic—GSMA report, Nov. 23, 2018) propose to use mobile communications networks for drone-based services. Besides the bandwidth requirements and the low latency required by the parties involved in the development of such drone-based services, connectivity to mobile networks and the basic functions inherent in connectivity have to be adapted to the context of drone connections. The growth of drone-based services is accompanied by an evolution of role models in the provision of services. Providers of value-added services, the entities providing the connectivity of the drones or even the parties involved in managing the drones and the pilots may thus be separate entities involved in the provision of services. A service provider (delivery service, transport service, assistance service) may call on a drone manager whose connectivity will be provided by an operator that is separate from the drone manager and/or separate from the service provider.

The GSMA, like the 3GPP (3GPP TR22.825: Remote identification of unmanned aerial systems (Stage1—R16)—September 2018) consider that the drone, like the pilot, have to be authenticated, for example using a SIM (or eSIM) card, guaranteeing that public or private space is not occupied by an unidentified remotely controlled vehicle. Correspondingly, some solutions are proposed for the identification and registration of drones, for drones to access the public domain or for the detection of corrupted drones. These solutions, which are based on separate solutions for identifying and authenticating drones and pilots, prove to be rigid and non-modifiable during a mission because, on the one hand, they are specific to a particular drone and pilot, and they do not establish a link between a pilot and a drone. On the other hand, these solutions are not linked to one particular service, apart from monitoring of the drone, which may be implemented from a UTM (Unmanned Aerial Vehicles Traffic Management), and therefore offer little possibility of developing differentiated services, for example requiring different qualities of service from connectivity of a drone or a fleet of drones.

The present invention aims to provide improvements with respect to the prior art.

3. DISCLOSURE OF THE INVENTION

The invention aims to improve the situation using a method for assigning a control system for controlling a remotely controlled vehicle, called a drone, said system being able to transmit data relating to at least one communication service and comprising a drone and a control entity for controlling said drone, the method comprising receiving a request to deploy the service, obtaining identification information for the control entity and an item of authentication data for the drone, determining a system assignment record comprising an association between the obtained identification information, the obtained item of authentication data and an identifier of the at least one service.

While drone systems relating to the prior art are based on processes of identifying a drone, on the one hand, and the control or piloting entity, on the other hand, the invention allows a drone to be associated with a control entity for controlling the drone, this entity being able to be a remote control or the operator responsible for controlling the drone and a service. The control may correspond to piloting or monitoring. The advantage of such a solution is that of being able to call upon the system, associating a drone and a control entity, in a single step in order to provide a communication service, established from connectivity of the drone or of a device on board the drone. In a context in which the number of systems increases, as well as in a context in which a single system is able to support multiple services simultaneously, the presence of a service identifier at registration allows the operator of the system to be able to assign a system for certain missions as a priority, for example relating to a security service. The item of data relating to a type of service, which may be a service identifier or a protocol port number, may also inform the operator of the system, as well as the service provider, about the occupancy or the load of the system at a given time.

Determining the registration of the system makes it possible to simplify the management of the services implemented from the drone, since a service provider will have a record, and possibly an identifier of this record, therefore of a duly authenticated drone for which a control entity is correctly identified and associated, from which it is able to deploy the service identified in the record. The assignment method, which may for example be implemented by an operator, furthermore guarantees the service provider that the association between a drone, a control entity and a service is valid, allowing the service provider to have a complete offering that goes beyond a separate authentication of a drone and the identification of the control entity. This method furthermore allows easier development of a database used for service management and for managing fleets of drones, this base being able to be based directly on the various records, possibly certified by the entity responsible for the assignment, and creating the link between a control entity and a drone.

According to one aspect of the invention, in the assignment method, the record furthermore comprises an item of data relating to a quality of service supported by the system.

A system may comprise specific features in terms of data rate and/or latency or other quality of service parameters. The item of data relating to the quality of service may advantageously be used to authorize or not authorize the system being made available for services requiring a quality of service compatible with that supported by the system. A live television broadcasting service of images filmed by a drone could thus for example be offered if the system record indicates that the drone has actually subscribed to a broadband network connectivity offering.

According to another aspect of the invention, in the assignment method, the record furthermore comprises at least one feature of the drone and/or of the control entity. Drones, depending on the types of connection they support and/or the protocols they support, might not be suitable for certain services. The same applies for control devices, which do not allow drones to be piloted under certain conditions or at a certain distance from the drone. It is therefore advantageous to be able to indicate this information in the records in order to select the system most suitable for a given service.

According to another aspect of the invention, in the assignment method, the item of authentication data furthermore comprises an item of identification data for a device on board the drone.

The communications service may be implemented by the drone or by a device, such as a camera, a detector or a transmitter installed on the drone. If the communications service relates to a device on board the drone, it is advantageous to identify the device in addition to the drone so as to be able to possibly differentiate between the services associated with the various devices in the records.

According to another aspect of the invention, in the assignment method, the record furthermore comprises a drone connectivity parameter.

Drones will increasingly be piloted outside of the field of view of the pilot, and it may be important, in order to use the system, to indicate for example the various access technologies supported by the drone, or even the versions of the software providing the connectivity of a drone of the system.

According to another aspect of the invention, in the assignment method, the record furthermore comprises an item of accreditation data for the association of the identification information and the item of authentication data.

Drone movements, and in particular drone flights, are strictly regulated, and a service provider calling on a drone system may require an item of system accreditation data. This accreditation comprises for example the authorization issued to the drone and also the authorizations issued to the control entity, thus allowing a service provider to call upon the various bodies responsible for accreditations and authorizations. Accreditation may be granted by the operator responsible for implementing the assignment and the association in the record, thus giving the operator the role of a trusted entity for implementing drone-based communications systems.

According to another aspect of the invention, in the assignment method, the record furthermore comprises an identifier of a geographical space in which the system is able to be used.

The movement of a drone, in particular in airspace, is strictly regulated, and authorizations are more often than not required to be able to use a drone in a given space. The record of the system may advantageously comprise an identifier of a geographical space in which the drone is authorized to move. This could be a private space, such as a space around a factory or a strategic center, or a public space but with a limitation set for example by coordinates, for example GPS (Global Positioning System) coordinates. The space identifier may be used to authorize or not authorize the implementation of certain applications from this system.

According to another aspect of the invention, in the assignment method, obtaining identification information for the control entity furthermore comprises acquiring an item of authentication data for the control entity.

A control entity may be a person, also called a pilot, responsible for controlling the drone, or else a control device, such as a remote control, for directing the drone remotely, or even the person and the remote control. The person or pilot may be uniquely identified, by a name or a telephone number or even by an approval number for piloting the drone, while the remote control, or control device, is authenticated for example from a SIM card of the remote control, improving the security of the system.

According to another aspect of the invention, the assignment method furthermore comprises determining a connection profile associated with the service.

It is possible that separate services require identical features in terms of connectivity or quality of service. The association of a connection profile with the service is then used to determine a system. A variety of services, or applications, may thus correspond to one and the same connection profile possibly associated with a system identified in a record. Determining a connection profile therefore makes it possible to reduce the number of systems and to be able to pool a system for a set of services having the same connection profile.

According to another aspect of the invention, the assignment method furthermore comprises associating the record with one or more slices of a communication network.

The communications networks currently being specified and deployed, such as what are called fifth-generation networks, are structured in network slices, as they are known, corresponding to specific routing, quality of service and security features. A record of a drone system may advantageously be associated with a slice identifier so that the data routed on this system benefit from processing that corresponds to the data from services offered from the system and to the features of the slice. According to another aspect of the invention, the assignment method comprises receiving a record modification message, comprising updating the identification information for the control entity or a new item of authentication data for the drone. For a given record, it is possible to modify a drone and/or a control entity for controlling the drone without however necessarily modifying the services or applications offered from the system, or even the features of the system. In particular, when a drone is unavailable to be recharged, an item of authentication data for an equivalent drone may be used, and the record is updated. The services indicated in the record are thus not stopped following the update to the record. The item of authentication data for the drone or the identification information for the control entity, or even the service identifier and the other information also present in the record, may also be updated if the record is valid for a limited time and has to be renewed regularly over time.

The various aspects of the assignment method that have just been described may be implemented independently of one another or in combination with one another.

The invention also relates to a device for assigning a control system for controlling a remotely controlled vehicle, called a drone, said system being able to transmit data relating to at least one communication service and comprising a drone and a control entity for controlling said drone, said device comprising an obtainment module, able to obtain identification information for the control entity and an item of authentication data for the drone and a determination module, able to determine a system assignment record comprising an association between the obtained identification information, the obtained item of authentication data and an identifier of the at least one service.

This device, which is able, in all of its embodiments, to implement the assignment method that has just been described, is intended to be implemented in a communication infrastructure management entity, in a communication service management entity or in a system management entity.

The invention also relates to a system for assigning a control system for controlling a remotely controlled vehicle, called a drone, said assignment system being able to transmit data relating to at least one communication service and comprising a drone, a control entity for controlling said drone and an assignment device.

The invention also relates to a computer program comprising instructions for implementing the steps of the assignment method that has just been described when this program is executed by a processor and to a recording medium able to be read by an assignment device and on which the computer program is recorded.

This program may use any programming language and be in the form of source code, object code or intermediate code between source code and object code, such as in a partially compiled form, or in any other desirable form.

The invention also targets a computer-readable information medium comprising instructions of the computer program as mentioned above.

The information medium may be any entity or device capable of storing the program. For example, the medium may comprise a storage means, such as a ROM, for example a CD-ROM or a microelectronic circuit ROM, or else a magnetic recording means, for example on a hard disk.

Moreover, the information medium may be a transmissible medium such as an electrical or optical signal, which may be routed via an electrical or optical cable, by radio or by other means. The program according to the invention may in particular be downloaded from an Internet network.

As an alternative, the information medium may be an integrated circuit into which the program is incorporated, the circuit being designed to execute or to be used in the execution of the method in question.

4. BRIEF DESCRIPTION OF THE DRAWINGS

Figure 2:
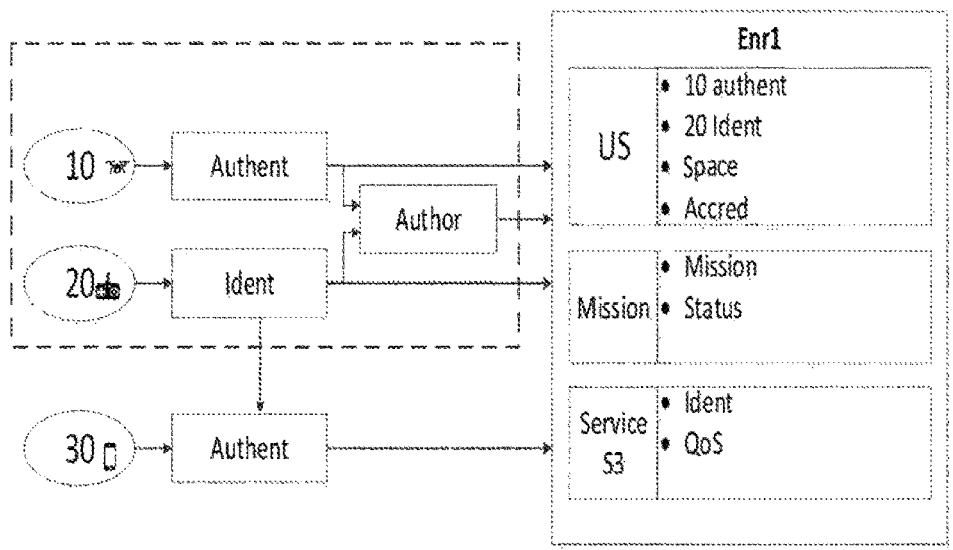
Figure 3:
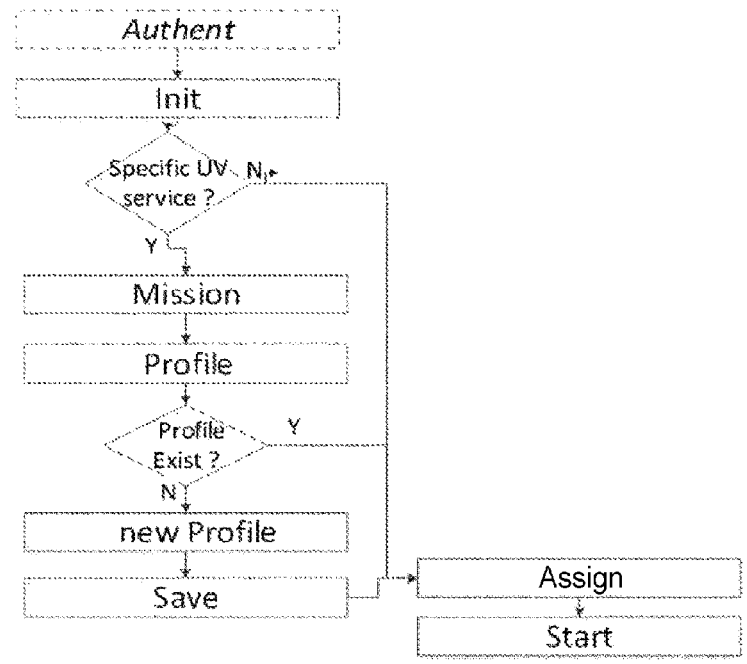
Figure 4:
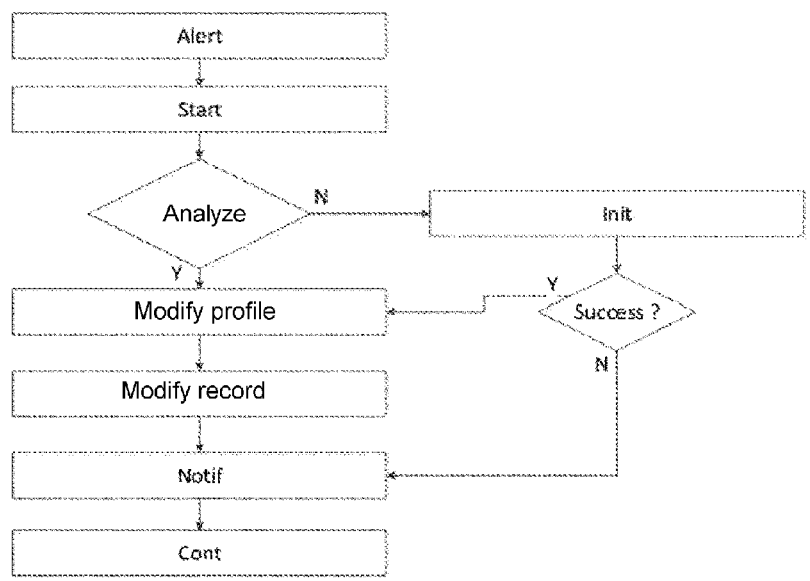
Figure 5:
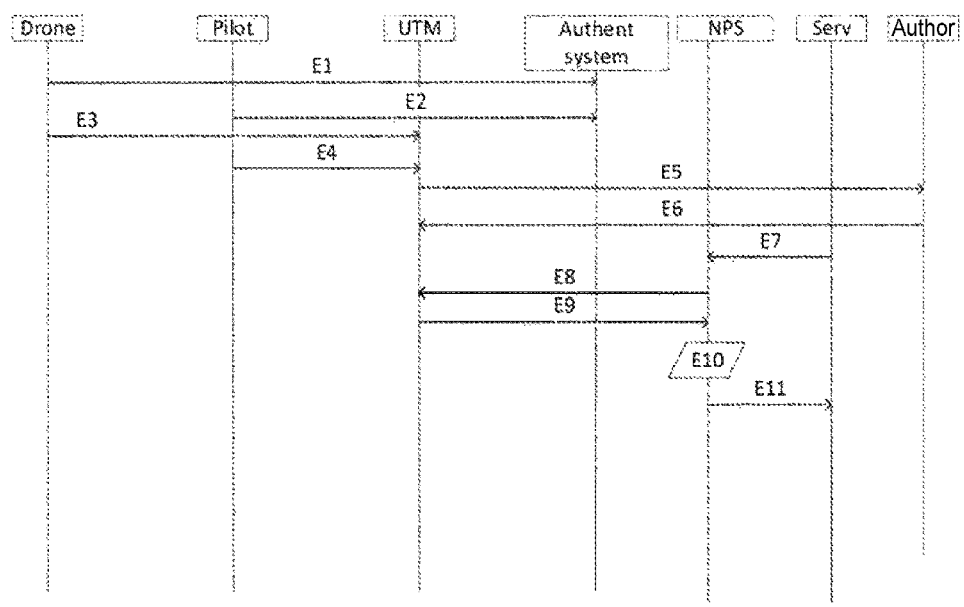
Figure 6:
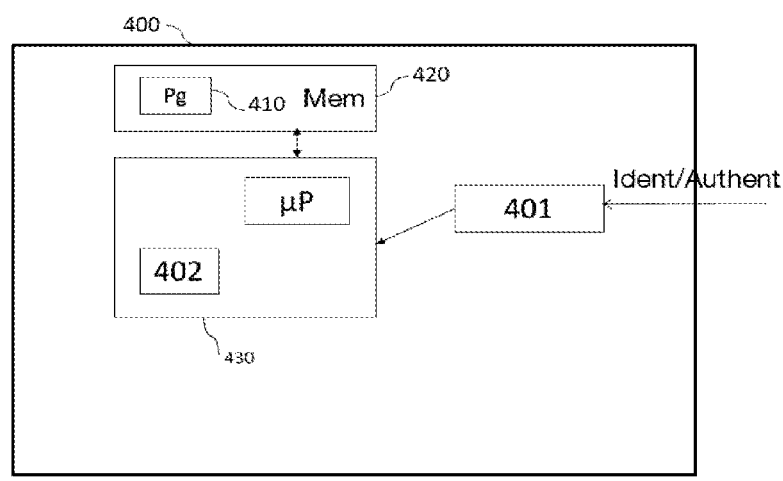

Other features and advantages of the invention will become more clearly apparent upon reading the following description of particular embodiments, provided by way of simple illustrative and nonlimiting examples, and the appended drawings, in which:

FIG. 1 shows a control system for controlling a remotely piloted vehicle according to a first embodiment of the invention, FIG. 2 shows an identification of a control system for controlling a remotely piloted vehicle used to transmit data of a service, according to one aspect of the invention, FIG. 3 shows an overview of the method for assigning a control system for controlling a remotely controlled vehicle according to a first embodiment of the invention, FIG. 4 shows an overview of the method for assigning a control system for controlling a remotely controlled vehicle according to a second embodiment of the invention, FIG. 5 shows an overview of the method for assigning a control system for controlling a remotely controlled vehicle according to a third embodiment of the invention, FIG. 6 shows one example of the structure of an assignment device according to one aspect of the invention.

5. DESCRIPTION OF THE EMBODIMENTS

The remainder of the description presents embodiments of the invention in a communication infrastructure. Drones and control devices may communicate using Wi-Fi or cellular technologies (3G, 4G, 5G).

Reference is made to [FIG. 1], which shows a control system for controlling a remotely piloted vehicle according to a first embodiment of the invention. A remotely piloted vehicle 10, which will be called a drone in the remainder of the description, moves under the control of a control entity 20. The control entity 20 may be a person responsible for piloting the drone remotely, or else a control device, such as a remote control, or even a person and a remote control. In this example, it is considered to be a device. The device 20, according to one example, makes it possible to move the drone 10 along a trajectory decided by the device 20. According to another example, the control device 20 provides a control mission for controlling the drone 10, but said drone moves autonomously, for example following a trajectory that is preconfigured on the drone 10. The remotely piloted vehicle 10 and device 20 assembly is often referred to as US (Unmanned Vehicle System). According to one alternative, the drone 10 has one or more on-board terminals able to record, transmit or receive data from or to the entity 30, represented here by a mobile terminal. The drone 10 is attached to an access network AN1. The control device 20 is attached to an access network AN2, which may be different or the same as the access network AN1, depending in particular on the geographical distance between the drone and its pilot (in direct line of sight or outside of the line of sight). According to [FIG. 1], the drone 10 and the device 20, as connected objects, are authenticated on the respective access networks AN1 and AN2 and are possibly additionally registered by a UTM function (in particular for administrative services and flight monitoring).

The drone 10 and the device 20 are implemented so as to provide a service S3. Owing to the evolution of role models in the provision of value-added drone services, the entity 30 requesting the service S3, or involved in the provision of the service S3, may be separate from the US. According to the example illustrated in [FIG. 1], the entity 30 is a client of the service S3 and retrieves the data collected by the drone 10 attached to the access network AN3. By way of example, a service S3 may correspond to a service requested by a service provider different from the entity responsible for the drone, and may correspond to a delivery service, to a mapping service, to a video transmission service or even to a connectivity service. A service may also correspond to a service corresponding to a task or a feature of the drone, such as a movement service, a location service, for example a GPS location service, a cellular or Wi-Fi access service, or a transmission service regarding data on a communication infrastructure, for example based on network slices. The entity 30 may also be an entity of the drone or of the control entity for controlling the drone. The drone 10 and the control device 20 correspond to a control system PILOT for implementing a service S3. When the service is implemented from the system PILOT, a system assignment record for the service S3 is created. According to one example, the service S3 is identified by a service identifier, a number or a protocol name, and/or an identifier of the entity 30. The operator of the PILOT may make the system PILOT available to provide other services, such as the services S1 and S2, that are initially not implemented from the system PILOT. Determining the system PILOT thus makes it possible to deploy drone-based services more quickly and without having to re-authenticate a drone, a control device or even being able to choose a system PILOT whose features in terms of drones and device are compatible with the service to be deployed. The system PILOT may advantageously exchange information with the UTM function in order to obtain features of the drone 10 and/or of the control device 20.

FIG. 2 shows an assignment of a control system for controlling a remotely piloted vehicle used to transmit data of a service, according to one aspect of the invention. This [FIG. 2] shows a drone 10, a control entity 20 which, according to this embodiment, is a control device 20, and a terminal 30 in accordance with the same entities presented in [FIG. 1]. The drone 10 is authenticated (Authent) and the control device 20 is identified (Ident). Obtaining the identification information for the device 20 comprises acquiring an item of authentication data for this device 20, the obtainment and the acquisition being able to be simultaneous or successive. These entities are each authenticated (authent), as connected objects, in particular in order to connect to the access networks to which they are respectively attached. The identification of the control device 20 comprises an item of authentication data for the device 20. The drone 10 and the device 20 additionally have an authorization (author) allowing the drone to be able to move in a public and private space, this authorization being able to be issued for example by an airspace control authority and possibly acquired via a UTM function. In [FIG. 2], a terminal 30 attached to an access network and duly authenticated, in accordance with the indicated information (authent), accesses a service S3 the data of which are transmitted or received by the drone itself or else by a device installed on the drone, the drone being under the control of the entity 20. According to the prior art, these various equipments, specifically the drone, the control device, or even the service S3 accessed by the terminal 30, are managed separately from one another, in particular by virtue of the respective authentications. According to the prior art, a UTM function may associate the drone 10 and the control entity 20, but in accordance with a fixed implementation that does not allow for example one equipment to be replaced by another without having to reinitialize the entire connection procedure between the various elements (drone 10, control device 20 and service), which may lead to a service or network connection discontinuity. According to the invention, a record Enr1 is created for this environment consisting of the drone 10, the device 20 and a service S3.

The record consists of an item of authentication data (Authent) for the drone 10. This item of authentication data may be IMSI information of the drone's SIM or e-SIM card or else an authentication key determined when the drone 10 is authenticated with an access network. The record also comprises identification information for the control entity 20, which may be an alphanumeric character string obtained when the device is validated with an authority, from a configuration address to the access network to which it is connected. This identification information may also comprise an item of authentication data for the control device, for example to the access network to which it is attached. The record furthermore comprises an identifier of the service S3 implemented for the drone 10 and the device 20. Associating these three items of data makes it possible to manage the complete system for providing the service S3 from a drone 10, facilitating management for the operator of the drone, as well as updating thereof through the addition of services, replacement of the drone with another one or troubleshooting of a service through direct identification of the entities responsible for providing the service.

According to one alternative, the record furthermore comprises information (Space) corresponding to an identifier of the space in which the drone is authorized to move. This information may be alphanumeric characters identifying a space, for example "private" or "public", or else GPS coordinates corresponding to the limits beyond which the drone is not allowed to move.

The record Enr1, according to another example, comprises an item of accreditation data (Accred) for the association between the identification information for the control device and the item of authentication data for the drone. This item of accreditation data may be valid for a limited time or for an infinite duration, and may be updated according to the modification of the item of data or information. This item of data may also be used by a service provider to select an effectively accredited association, which is useful in particular when a service requiring a high level of security is supported by the system.

According to one example, the record Enr1 comprises an item of data (QoS) relating to a quality of service supported by the system. This item of data is used in particular to determine a system adapted to the constraints of the service to be implemented. The record Enr1 may thus comprise multiple sub-records relating to the various services supported by the system.

The record Enr1 comprises three US (Unmanned Vehicle System), Service S3 and Mission sub-records. The record thus comprises, according to one alternative, a Mission sub-record comprising for example a "Mission" parameter, indicating for example whether the system has a commercial purpose, or whether the system is implemented for a confidential purpose, or the Mission information may comprise information relating to the type of clients for which the system may be requested during the assignment. A confidential service will thus not be supported by a system intended to deliver commercial services, and vice versa. A parameter about the status of the mission may, according to one example, provide information about the type of mission, such as its temporary or infinite nature, or else about the entity responsible for the system.

The record of [FIG. 2] proposes to structure the data of the record End into 3 US, Mission and Service S3 sub-records. This structuring is given by way of example, and the data and parameters may be organized differently in the record Enr1.

FIG. 3 shows an overview of the method for assigning a control system for controlling a remotely controlled vehicle according to a first embodiment of the invention.

In a step Authent, a remotely controlled vehicle, also called a drone, connects and authenticates itself with an access network, which may be a cellular network or a Wi-Fi network. This authentication may be performed for example using a SIM or e-SIM card installed in the drone. A control entity also connects to an access network, identifies itself and authenticates itself with this access network. The access networks to which the drone and the control entity attach may be private networks used exclusively for drones, or public networks.

This phase Authent relates to the access networks and the authorities responsible for legislating drone movements. At this stage, the control entity and the drone are not associated. The authentication of the drone and the identification of the control entity are independent of one another. These steps allow the operator of the drone to retrieve identification information for the control entities and authentication data for the drones.

In a step Init, the assignment method is initialized. This initialization is triggered by the reception of a request to deploy a service. In this embodiment, it is considered that this is a service for the live retransmission of an event from a camera on board the drone to a set of terminals. This service deployment request may be issued by a service operator different from the operator of the drone or from an entity belonging to the operator of the drone. The request may advantageously comprise a quality of service feature for the retransmission service.

This step "Specific UV service" makes it possible to decide whether a system already assigned to a service may also be used to implement the service for which an assignment method is instantiated. If, in this step, the operator decides that each service gives rise to the assignment of a system, then this step may be omitted and a new system is assigned to each new service. In this case, or else if the retransmission service is not specific, that is to say its features are common to at least one other service that is already deployed, a system in the form of a record comprising identification information for the control entity, an item of authentication data for the drone and an identifier of the retransmission service is assigned in the step Assign. The record may advantageously comprise a feature of the drone and of the camera and/or of the control entity, these features being able to be linked to security functions or capabilities in terms of supported protocols or even available data rates. In this embodiment, the item of authentication data for the drone advantageously comprises an item of identification data for the camera, this item of data possibly being an IP address or a name used for example in a name server to associate the name of the camera with a network identifier, such as the one to which the drone is connected.

If a specific retransmission service is requested, two steps Mission and Profile, for analyzing the mission relating to the retransmission service and for identifying the associated profile, are implemented. According to one example, upon receiving the request, the drone operator evaluates, in a step Mission, whether a system assigned to a current mission is able to be assigned to the data retransmission service. A mission comprises for example features such as a geographical area, a flight duration, specific regulations for the flight, in particular in terms of authorization to fly or number of drones, or even in relation to a flight plan. A control system that is compatible a priori to support a service may be incompatible since one or more features of the mission is/are incompatible with the retransmission service to be implemented. This step is not mandatory.

The step Profile consists in finding out whether a profile corresponding to this mission exists. For example, if the retransmission service is requested by a public authority for a critical event, the drone operator analyzes whether a profile corresponding to this critical mission has already given rise to an assignment of a system. The determination of a connection profile associated with the requested retransmission service, in the step Profile, may advantageously be used to ensure that a system is not shared between services that seem to be compatible but ultimately correspond to separate connection profiles, due to differences in terms of security, confidentiality or quality of service. If an existing profile, that is to say one already in use, corresponding to the determined profile, is identified in the step Profile Exist, then the existing system is also assigned (step Assign) to the determined profile. This makes it possible to pool systems for implementing separate services but for services having common Profile and possibly Mission features. If no profile, from among the profiles of the systems in use, corresponds to the determined profile, then a new profile is created in the step New Profile and saved in the step Save, so as to be able to be searched for and identified upon an assignment to be implemented for a new service. This new profile is assigned a drone system the features of which correspond to the new profile created in the step Assign.

The steps Specific UV Service, Mission, Profile, Profile Exist, New Profile, Save new Profile are optional, and a system may be assigned as soon as a new service has to be delivered, independently of the systems already assigned.

Regardless of the type of assignment implemented, by default, depending on the service, the mission or depending on the profile, the retransmission service is started, in the step Start, once a drone system, comprising a drone and a control device, is assigned to the retransmission service and a record corresponding to this assignment is determined.

FIG. 4 shows an overview of the method for assigning a control system for controlling a remotely controlled vehicle according to a second embodiment of the invention.

The steps from [FIG. 3] are not shown in this [FIG. 4], but it is assumed that a system assignment method has taken place for a service. In this embodiment, it is considered that an incident occurs in the step Alert and that a drone or a control entity, which in this example is a control device, is no longer operational or is about to be no longer operational. This may involve for example a problem with the battery of the drone or a problem with connectivity to an access network of the control device or of the drone. However, the service for which the system has been assigned has to be satisfied in spite of this alert. The alert may be issued by the drone or the control device or else by a system management entity. A process of modifying the assignment starts in the step Start. In the step Analyze, it is analyzed whether the identified problem is already known and whether there is a predefined solution for this problem. For example, a problem with the battery of the drone is predictable, while a problem with the connectivity of the drone following a SIM card failure is undoubtedly less so. If the problem is already known (branch Y), the record is modified in the step "Modify Record", for example by calling on another drone or another control device, depending on the problem encountered. A new item of authentication data for the drone and/or new identification information for the control device is used to update the record corresponding to the new assignment. Depending on the new drone that is used and/or the new control device that is identified, it may be necessary to modify the system profile in the step "Modify Profile", since the new system may correspond to a separate profile.

If the problem detected is not predefined (branch N), it may be necessary to restart an initialization method in the step Init, as defined in [FIG. 3]. If the step Init is performed successfully, the steps Modify Profile and Modify Record are continued as if the detected problem was predefined. If the step Init is not successful, in the step Notif, a notification is sent to the entity that transmitted a service deployment request in order to indicate to it that it is not possible to modify the assignment.

This modification of the assignment and therefore of the record makes it possible to be able to continue the service by modifying the system, and once it has been modified, a notification of the modification to the entity that sent the service request is transmitted in the step Notif. The notification may indicate success of the modification or failure of the modification. If the notification indicates success, in the step Cont, the service continues to be provided in spite of the change of assignment and record, but if the notification is failure of the modification, the step Cont corresponds to implementation of the retransmission service following the resolution of the incident that caused the alert or until the system is completely disabled, if the incident has not been resolved. In the worst-case scenario, the system cannot continue to be operational and the step Cont is not implemented.

The assignment method of FIG. 4 may also be used in the event of a change in the mission of the drone. For example, a surveillance drone detects an anomaly on the inspected infrastructure and has to adapt the service provided. In this case, the profile may be modified in order to meet a new retransmission need.

FIG. 5 shows an overview of the method for assigning a control system for controlling a remotely controlled vehicle according to a third embodiment of the invention.

In steps E1 and E2, the drone Drone and the control entity Pilot register and authenticate for example with a set of equipments such as eNodeB, HSS, MME for an LTE cellular network, while the control entity Pilot identifies itself and possibly authenticates itself with an access network. The identification consists in identifying the person responsible for controlling the drone, for example from his name and/or an approval number for controlling the drone, and this identification may also comprise authenticating the control device, as is performed for the drone. In this embodiment, the Drone and the Pilot authenticate themselves with the same equipments (called Authent system here) but, according to another example, the equipments are separate. This may involve procedures such as those corresponding to attachment to a GPRS/LTE/5G network from a SIM card. These steps correspond to the step Authent from [FIG. 3].

In steps E3 and E4, the Drone and the Pilot register with a UTM (Unmanned Traffic Management) entity for managing drones, which may be a specific entity or a sub-entity of a communication operator. During these registrations, the UTM entity obtains an item of authentication data for the Drone as well as identification information for the Pilot. This obtainment may also comprise receiving an item of authentication data for a control device for controlling the Pilot.

In steps E5 and E6, the UTM entity asks an Author entity responsible for authorizations to deploy drones, and receives in response an authorization for the Drone and the Pilot.

In a step E7, a Serv entity, which is a service provider, asks the NPS (Net-Pilot System) entity to assign a drone system for a surveillance service. According to one example, the Serv entity is the NPS entity, and asks the NPS entity to provide a given service specific to the NPS entity. According to one alternative, the Serv entity, which is separate from the NPS entity, transmits a request to provide a surveillance service. According to another alternative, the Serv entity asks the NPS entity for a generic data transmission service, which is therefore not identified as a surveillance service, with a view to reserving drone resources and to being assigned the Drone and the Pilot. In this case, the service is a default service, or best effort service, which will be indicated as such in the record resulting from the assignment. This record is possibly modified later on, for example using the steps described in [FIG. 4], when the provider issues a deployment request for a service that is more demanding in terms of transmission time, for example. According to some alternatives, the request issued to the NPS entity may be issued by the Drone, the Pilot or else the Author entity. In these cases, the NPS entity is hosted, respectively, by the Drone, the Pilot or the Author entity. If the drone issues this request, the service may relate to connectivity or to a network access service. If the request is issued by the Pilot, it may also involve a network access service or a service for controlling the Drone. If the request is issued by the Author entity, it may involve a service for monitoring the Drone for the needs of the Author entity, or else the establishment of a surveillance service on behalf of the Author entity.

In a step E8, the NPS entity asks the UTM entity to obtain information relating to drone systems. According to one alternative, the UTM entity is the NPS entity and, according to yet another alternative, the UTM entity has communicated the information from the drone systems registered therewith to the NPS entity, making step E8 non-essential.

In step E9, the UTM entity transmits the information about the Drone and the Pilot to the NPS entity. Only a Drone and a Pilot are shown but, according to one alternative, information relating to multiple drones and pilots may be transmitted to the NPS entity. In this step E9, the UTM entity also communicates an item of accreditation data for the association of the identification information and the item of authentication data, which may be added to the record when the drone system is assigned.

In step E10, the NPS entity assigns a system to provide a service and records the following data corresponding to the assignment: item of authentication data for the Drone, identification information for the Pilot and an identifier of the surveillance service requested by Serv. According to one example, this record comprises the IMSI code of a SIM card of the Drone, the IMSI code of a SIM card of the piloting device of the Pilot and a port number of the protocol used for the surveillance service. According to one alternative, the record furthermore comprises one or more items of information shown in FIG. 2 and that will have been communicated by the UTM, Author and Serv entities during implementation of the method. The record may furthermore comprise a drone connectivity parameter, which may be the types of access network to which the drone is able to attach and/or information about the technologies used to attach to the access networks (3G, 4G, 802.11, etc.). The profile information may also advantageously be added to the record in order to facilitate identification of a compatible profile during a following assignment.

In a step E11, the NPS entity indicates to the Serv entity (or to the Drone, to the Pilot or to the Author entity, according to the alternatives described above in step E7) the result of the assignment, while possibly indicating the record corresponding to this assignment. According to one alternative not shown in [FIG. 5], this result is also communicated to the UTM entity for monitoring the use of the drone systems, as well as possibly to the Author entity for monitoring the operations of the drone systems.

Once the assignment method is complete, the data from the remote surveillance service may effectively be transmitted by the Drone on the communication network to which it is attached. The data transmitted or received by the drone, or even the information exchanged between the Pilot and the Drone, may advantageously be transmitted on a network slice selected on the basis of the record comprising the drone system information and the identifier of the surveillance service. Associating the record with one (or more) network slices, for example by associating the record with a network slice or service identifier associated with the network slice, makes it possible to guarantee security, mission and quality of service needs possibly present in the record.

If an incident occurs on Drone and/or Pilot, the assignment and therefore the record may be modified in accordance with the steps described in [FIG. 4]. This modification may also lead to a change of network slice if security and quality of service parameters have for example changed during the modification.

FIG. 6 shows one example of the structure of an assignment device.

The assignment device 400 implements the assignment method, various embodiments of which have just been described.

Such a device 400 may be implemented in a communication infrastructure management entity, or in a communication service management entity.

For example, the device 400 comprises a processing unit 430, equipped for example with a microprocessor µP, and driven by a computer program 410, stored in a memory 420 and implementing the determination method according to the invention. On initialization, the code instructions of the computer program 410 are for example loaded into a RAM memory, before being executed by the processor of the processing unit 430.

Such a device 400 comprises:
an obtainment module 401, able to obtain identification information Ident for the control entity and an item of authentication data Authent for the drone
a determination module 402, able to determine a system assignment record comprising an association between the obtained identification information, the obtained item of authentication data and an identifier of the at least one service.

The assignment method and the corresponding assignment device and system may be implemented by a communications operator, such as a telecommunications operator, or else a specific entity responsible for managing drones and the flights of these drones. The movement of the drone requires a control entity, which may itself comprise a person responsible for control and/or else correspond to a control or administration console for controlling or administering the drone. The drone may move by air, land or sea depending on the commands transmitted by the control entity or autonomously in accordance with a pre-established movement plan, the control entity ensuring that the operation of the drone is nominal and that it follows the movement plan.

The assignment method advantageously makes it possible to link drones, control devices and services and to propose complete system management that then makes it possible to be able to manage the various entities or services not individually, but as a complete system that then makes it easier to reuse a system for other services or to substitute one drone or one control entity for another drone or a control entity that complies with the constraint of the one or more services implemented on a given system. This method furthermore makes it possible to be able to manage inter-service compatibilities or incompatibilities through system qualification parameters such as the profiles or missions of the systems that are able to be used to deliver services following a request from a service provider separate or not separate from the drone operator, which may also be a communications operator.

The assignment method therefore makes it possible to associate a set of services that a system supports with the system, and thus to correlate quality of service or security requirements with types of mission and profiles of drones. This then goes beyond DAAS (Drone As A Service) architectures in which the connectivity of the drone in particular is not taken into account to integrate features relating to connectivity and to a quality of service of a service to be delivered. The aim is therefore to select drone systems that offer connectivity to communications networks and are suitable for providing data communication services and to identify these, as well as their features, in order to deploy new data services.

The invention claimed is:

1. An assignment method comprising:
assigning a control system for controlling a remotely controlled vehicle, called a drone, said system being able to transmit data relating to at least one communication service and comprising a drone and a control entity for controlling said drone, the assigning being performed by a device and comprising:
receiving a request to deploy the at least one communication service,
obtaining identification information for the control entity and an item of authentication data of the drone, the item of authentication data being an IMSI information of the drone's SIM or e-SIM card or an authentication key determined when the drone is authenticated by an access network the drone is connected to, and
determining a system assignment record comprising an association between the obtained identification information, the obtained item of authentication data and an identifier of the at least one communication service.

2. The assignment method as claimed in claim 1, wherein the record furthermore comprises an item of data relating to a quality of service supported by the system.

3. The assignment method as claimed in claim 1, wherein the record furthermore comprises at least one feature of the drone or of the control entity.

4. The assignment method as claimed in claim 1, wherein the item of authentication data furthermore comprises an item of identification data for a device on board the drone.

5. The assignment method as claimed in claim 1, wherein the record furthermore comprises a drone connectivity parameter.

6. The assignment method as claimed in claim 1, wherein the record furthermore comprises an item of accreditation data for the association of the identification information and the item of authentication data.

7. The assignment method as claimed in claim 1, wherein the record furthermore comprises an identifier of a geographical space in which the system is able to be used.

8. The assignment method as claimed in claim 1, wherein obtaining identification information for the control entity furthermore comprises acquiring an item of authentication data for the control entity.

9. The assignment method as claimed in claim 1, furthermore comprising determining a connection profile associated with the at least one communication service.

10. The assignment method as claimed in claim 1, furthermore comprising associating the record with one or more slices of a communication network.

11. The assignment method as claimed in claim 1, comprising receiving a record modification message, comprising updating the identification information for the control entity or a new item of authentication data for the drone.

12. The assignment method as claimed in claim 1, which further comprises:
assigning the control system such that features of the control system correspond to the system assignment record.

13. A device comprising:
a processor; and
a non-transitory computer-readable medium comprising program code instructions which when executed by the processor configure the device to assign assigning a control system for controlling a remotely controlled vehicle, called a drone, said system being able to transmit data relating to at least one communication service and comprising a drone and a control entity for controlling said drone, the assigning comprising:
receiving a request to deploy the at least one communication service,
obtaining identification information for the control entity and an item of authentication data of the drone, the item of authentication data being an IMSI information of the drone's SIM or e-SIM card or an authentication key determined when the drone is authenticated by an access network the drone is connected to, and
determining a system assignment record comprising an association between the obtained identification information, the obtained item of authentication data and an identifier of the at least one communication service.

14. An assignment system for assigning a control system for controlling a remotely controlled vehicle, called a drone, said assignment system being able to transmit data relating to at least one communication service and comprising:
the drone,
a control entity for controlling said drone, and
an assignment device comprising:
a processor; and
a non-transitory computer-readable medium comprising program code instructions which when executed by the processor configure the device to assign the drone and the control entity to provide the at least one communication service, the assigning comprising:
receiving a request to deploy the at least one communication service,
obtaining identification information for the control entity and an item of authentication data of the drone, the item of authentication data being an IMSI information of the drone's SIM or e-SIM card or an authentication key determined when the drone is authenticated by an access network the drone is connected to, and
determining a system assignment record comprising an association between the obtained identification information, the obtained item of authentication data and an identifier of the at least one communication service.

15. A non-transitory computer-readable medium comprising instructions stored thereon which when executed by a processor of an assignment device configure the assignment device to:
assign a control system for controlling a remotely controlled vehicle, called a drone, said system being able to transmit data relating to at least one communication service and comprising a drone and a control entity for controlling said drone, the assigning comprising:
receiving a request to deploy the at least one communication service,
obtaining identification information for the control entity and an item of authentication data of the drone, the item of authentication data being an IMSI information of the drone's SIM or e-SIM card or an authentication key determined when the drone is authenticated by an access network the drone is connected to, and
determining a system assignment record comprising an association between the obtained identification information, the obtained item of authentication data and an identifier of the at least one communication service.

* * * * *